(12) United States Patent
Ballentine (10) Patent No.: US 11,248,737 B2
(45) Date of Patent: Feb. 15, 2022

(54) CLAMPS

(71) Applicant: Trent Ballentine, Carrollton, TX (US)

(72) Inventor: Trent Ballentine, Carrollton, TX (US)

( * ) Notice: Subject to any disclaimer, the term of this patent is extended or adjusted under 35 U.S.C. 154(b) by 0 days.

(21) Appl. No.: 16/990,282

(22) Filed: Aug. 11, 2020

(65) Prior Publication Data

US 2021/0048140 A1 Feb. 18, 2021

Related U.S. Application Data

(60) Provisional application No. 62/885,618, filed on Aug. 12, 2019.

(51) Int. Cl.
*F16M 11/14* (2006.01)

(52) U.S. Cl.
CPC .................................. *F16M 11/14* (2013.01)

(58) Field of Classification Search
CPC ............. F16M 11/14; F16M 2200/022; F16M 11/2078; F16M 2200/027; F16C 11/106; F16C 11/06; F16B 7/1427; F16B 7/1454; F16B 7/1418; F16B 7/14
USPC ..... 248/663, 481–484, 181.1–181.2, 288.31, 248/288.51, 221.11, 316.2, 222.13, 248/229.11, 229.21, 228.2, 230.2, 231.31
See application file for complete search history.

(56) References Cited

U.S. PATENT DOCUMENTS

| 1,187,109 | A | 6/1916 | Steuemagel |
| 1,241,215 | A | 9/1917 | Hoffman |
| 1,918,519 | A | 7/1933 | Clements |
| 2,166,208 | A * | 7/1939 | Dayton ................. B60D 1/065 280/513 |
| 2,260,995 | A * | 10/1941 | Andrewkruczek ... F16C 11/106 403/90 |
| 2,260,996 | A * | 10/1941 | Andrewkruczek ....... B25B 1/22 403/71 |
| 2,433,594 | A | 12/1947 | Calo |
| 3,211,405 | A | 10/1965 | Fey et al. |
| 4,029,279 | A | 6/1977 | Nakatani |
| 4,174,900 | A | 11/1979 | Ina |
| 4,185,936 | A | 1/1980 | Takahashi |
| 4,214,724 | A | 7/1980 | Geiger |

(Continued)

OTHER PUBLICATIONS

U.S. Pat. No. 0138385 issued Apr. 29, 1873, applicant Elliott.
U.S. Pat. No. 0453649 issued Jun. 9, 1891, application Lindsey.
U.S. Pat. No. 0687347 issued Nov. 26, 1901, applicant Stapleton.

*Primary Examiner* — Christopher Garft
(74) *Attorney, Agent, or Firm* — Andrus Intellectual Property Law, LLP (57) ABSTRACT

A clamp for releasably clamping onto a sphere of an adapter includes a body having a sidewall and a cavity, a pivot member coupled to the body and defining a pivot axis, a cam cylinder positioned around the pivot member, a plunger coupled to the cam cylinder, and a lever coupled to the cam cylinder and being pivotable about the pivot axis. When the lever is pivoted in a first pivot direction from a unlocked position to a locked position, a cam surface cams the plunger in a first plunger direction such that the plunger engages the sphere and the sphere is held between the plunger and the sidewall thereby securing the sphere in the cavity. When the lever is pivoted in a second pivot direction from the locked position to the unlocked position, the cam surface cams the plunger in a second plunger direction such that the sphere is freely removable from the cavity.

10 Claims, 9 Drawing Sheets

(56) References Cited

U.S. PATENT DOCUMENTS

| | | |
|---|---|---|
| 4,339,113 A | 7/1982 | Vosper |
| 4,430,017 A | 2/1984 | Stefancich |
| 4,596,484 A | 6/1986 | Nakatani |
| D286,369 S | 10/1986 | Hahn |
| 4,761,092 A | 8/1988 | Nakatani |
| 4,893,810 A | 1/1990 | Lee |
| 4,974,802 A | 12/1990 | Hendren |
| 5,591,109 A | 1/1997 | Stmad |
| 5,694,695 A | 12/1997 | Lund |
| 6,142,699 A | 11/2000 | Pao |
| 6,352,228 B1 | 3/2002 | Buerklin |
| 6,581,528 B2 | 6/2003 | Tseng |
| D477,979 S | 8/2003 | Hermann |
| 6,854,697 B2 | 2/2005 | Akaike |
| 6,942,187 B2 | 9/2005 | Blackburn |
| D543,820 S | 6/2007 | Brass et al. |
| 7,288,117 B2 | 10/2007 | Benson |
| 7,300,028 B2 | 11/2007 | Vogt |
| 8,083,265 B1 * | 12/2011 | Chen ................ F16L 37/18 285/88 |
| 8,257,231 B2 | 9/2012 | Bingham, Jr. et al. |
| 8,876,169 B2 * | 11/2014 | Chen ................ F16L 37/18 285/312 |
| 9,109,616 B1 | 8/2015 | Ballentine |
| 2006/0127167 A1 | 6/2006 | Hsieh |
| 2008/0216262 A1 | 9/2008 | Kennedy et al. |
| 2010/0080650 A1 * | 4/2010 | Gorza ................ B62J 1/08 403/374.5 |
| 2011/0147548 A1 * | 6/2011 | Kang ................ F16M 11/14 248/181.2 |
| 2012/0324682 A1 | 12/2012 | Ballentine |
| 2013/0106095 A1 * | 5/2013 | Chen ................ F16L 37/18 285/85 |
| 2016/0091133 A1 * | 3/2016 | Li ................ F16M 11/14 248/181.1 |
| 2017/0232648 A1 * | 8/2017 | Chen ................ B29C 45/14 264/259 |

* cited by examiner

CLAMPS

CROSS-REFERENCE TO RELATED APPLICATION

The present disclosure is based on and claims priority to U.S. Provisional Patent Application No. 62/885,618 filed Aug. 12, 2019, the disclosure of which is incorporated herein by reference.

FIELD

The present disclosure relates to clamps that securely couple to a device.

BACKGROUND

The following U.S. patent is incorporated herein by reference in entirety.

U.S. Pat. No. 9,109,616 discloses a clamp that is for clamping a first member to a second member. The clamp comprises a lever that is rotatably coupled to the first member and a plunger. The lever comprises a handle and a cam that rotate together about a rotational axis. Rotation of the lever about the axis in a first direction cams the plunger towards the second member to couple the first and second members together and wherein rotation of the lever about the axis in a second, opposite direction cams the plunger away from the second member to uncouple the first and second members from each other.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In certain examples, a clamp for releasably clamping onto a sphere of an adapter includes a body having a sidewall and a cavity, a pivot member coupled to the body and defining a pivot axis, a cam cylinder positioned around the pivot member, a plunger coupled to the cam cylinder, and a lever coupled to the cam cylinder and being pivotable about the pivot axis. When the lever is pivoted in a first pivot direction from a unlocked position to a locked position, a cam surface cams the plunger in a first plunger direction such that the plunger engages the sphere and the sphere is held between the plunger and the sidewall thereby securing the sphere in the cavity. When the lever is pivoted in a second pivot direction from the locked position to the unlocked position, the cam surface cams the plunger in a second plunger direction such that the sphere is freely removable from the cavity.

In certain examples, a clamp for releasably clamping onto a sphere of an adapter includes a body having a sidewall, a cavity, a passageway, and a bore extending transverse to the passageway, a pivot member coupled to the body and defining a pivot axis, a cam cylinder positioned around the pivot member, a plunger coupled to the cam cylinder and extending in the passageway, and a lever coupled to the cam cylinder and being pivotable about the pivot axis. When the lever is pivoted about the pivot axis in a first pivot direction from an unlocked position to a locked position, the lever rotates the cam cylinder such that a cam surface cams the plunger in a first plunger direction and the plunger engages the sphere. A locking assembly in the bore locks the position of the plunger in the passageway when the lever is in the locked position.

In certain examples, a clamp for releasably clamping onto a sphere of an adapter includes a body having a sidewall, a cavity, and a passageway, a pivot member coupled to the body and defining a pivot axis, a cam cylinder positioned around the pivot member, a plunger coupled to the cam cylinder and extending in the passageway, and a lever coupled to the cam cylinder and being pivotable about the pivot axis. When the lever is pivoted about the pivot axis in a first pivot direction from an unlocked position to a locked position, the lever rotates the cam cylinder such that a cam surface cams the plunger in a first plunger direction and the plunger engages the sphere. A resilient member is positioned in the cam cylinder and extends between the pivot sleeve and the lever such that the resilient member is configured to resiliently bias the plunger against the sphere.

Various other features, objects, and advantages will be made apparent from the following description taken together with the drawings.

BRIEF DESCRIPTION OF THE DRAWINGS

The present disclosure is described with reference to the following Figures. The same numbers are used throughout the Figures to reference like features and like components.

DETAILED DESCRIPTION

Figure 1:
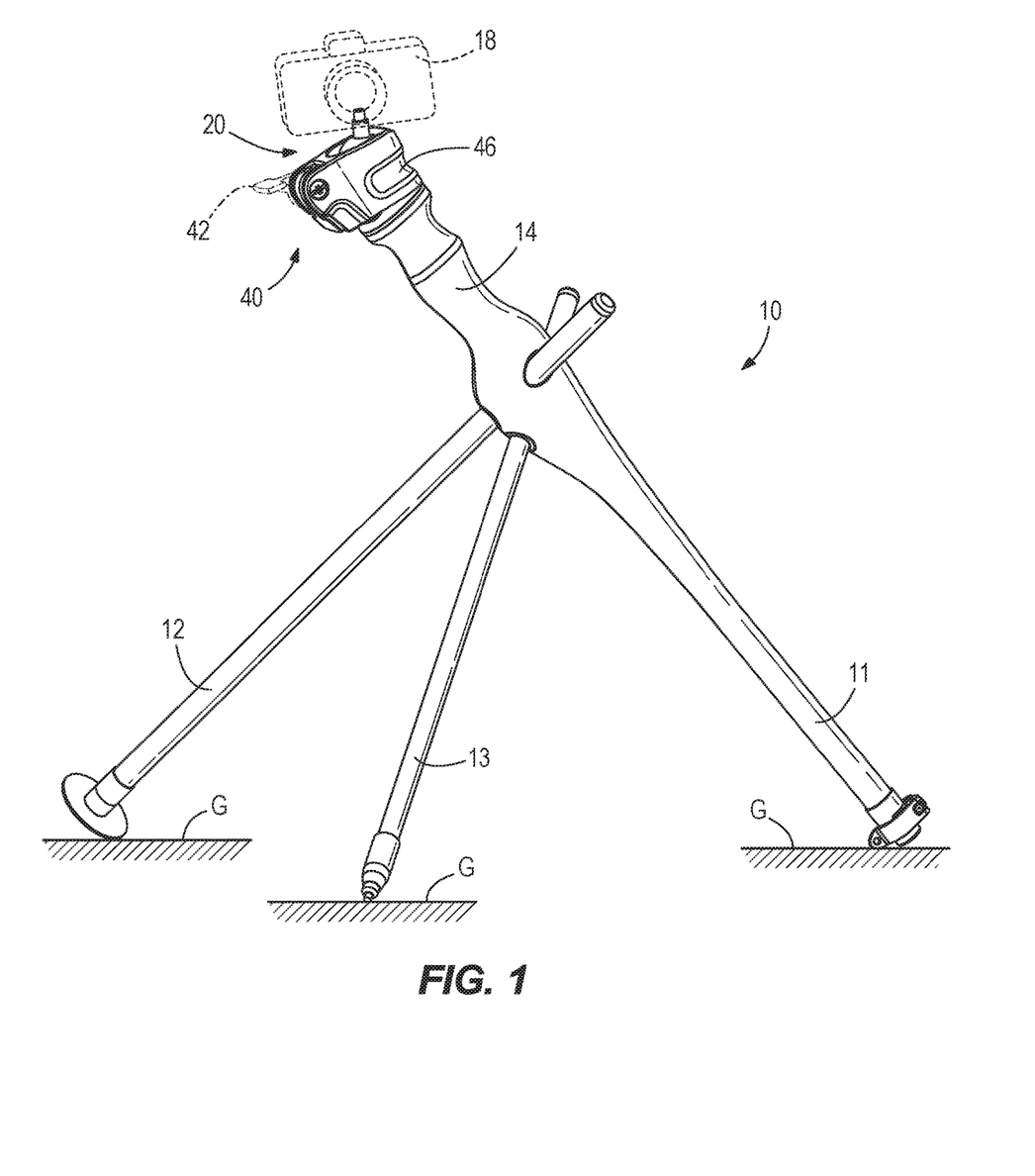
FIG. 1 is a perspective view of a tripod with an example clamp of the present disclosure.

FIG. 1 depicts three legs 11, 12, 13 of an example tripod 10 contacting the ground G such that the tripod 10 is supported thereon. The tripod 10 has a handle 14 that can be grasped by a user to thereby move the tripod 10. The tripod 10 is convertible into a walking stick by disconnecting two of the legs 12, 13 from the handle 14 and coupling the legs 12, 13 to the first leg 11 in an end-to-end orientation (not shown).

Figure 2:
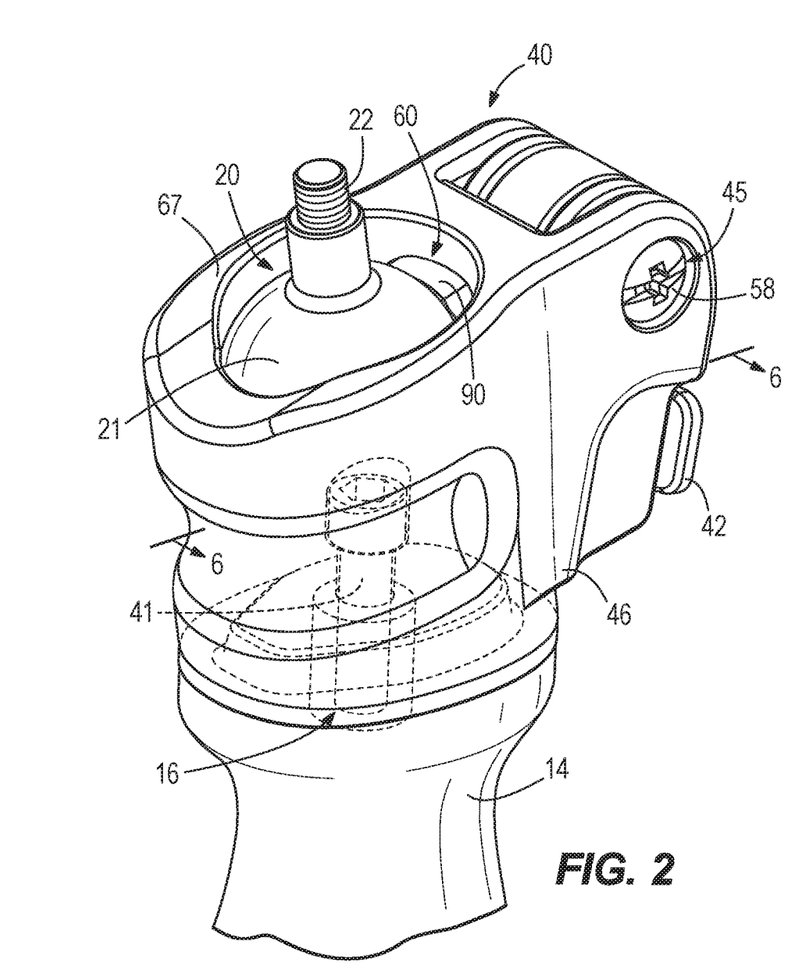
FIG. 2 is a perspective view of the clamp of FIG. 1. The connection features between the tripod and the clamp are depicted in dashed lines.
Figure 3:
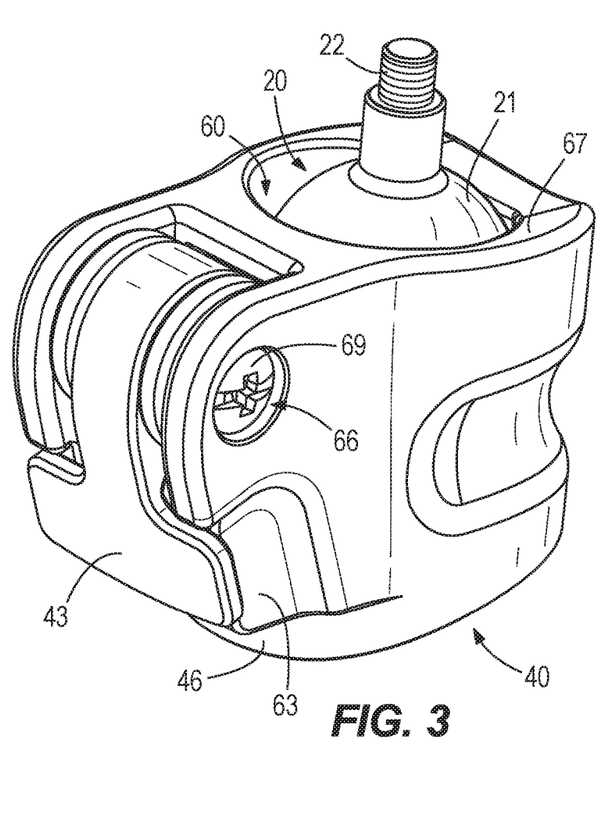
FIG. 3 is another perspective view of the clamp of FIG. 1.
Figure 6:
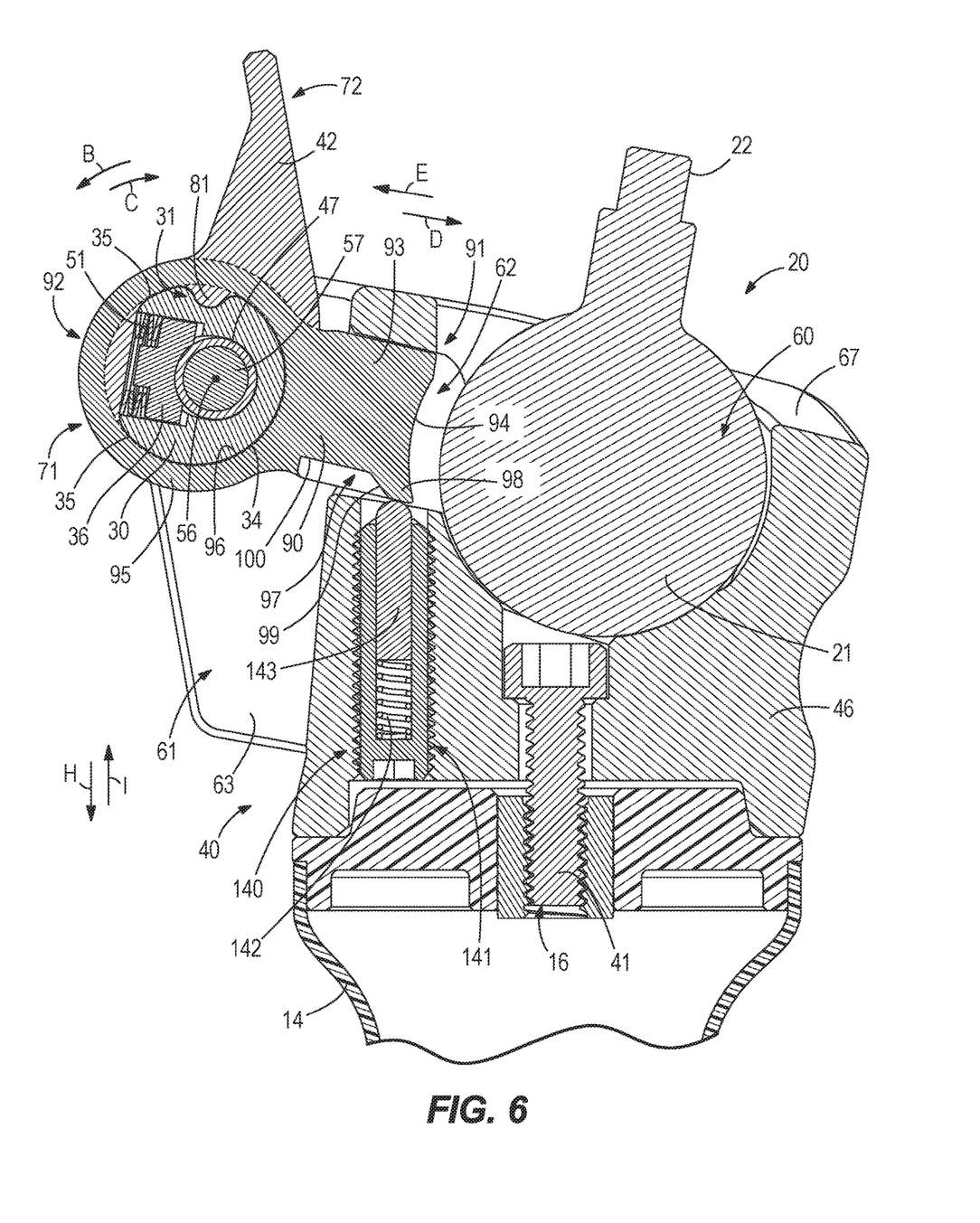
FIG. 6 is a cross-sectional view of the clamp of FIG. 1 with a lever in an unlocked position.
Figure 7:
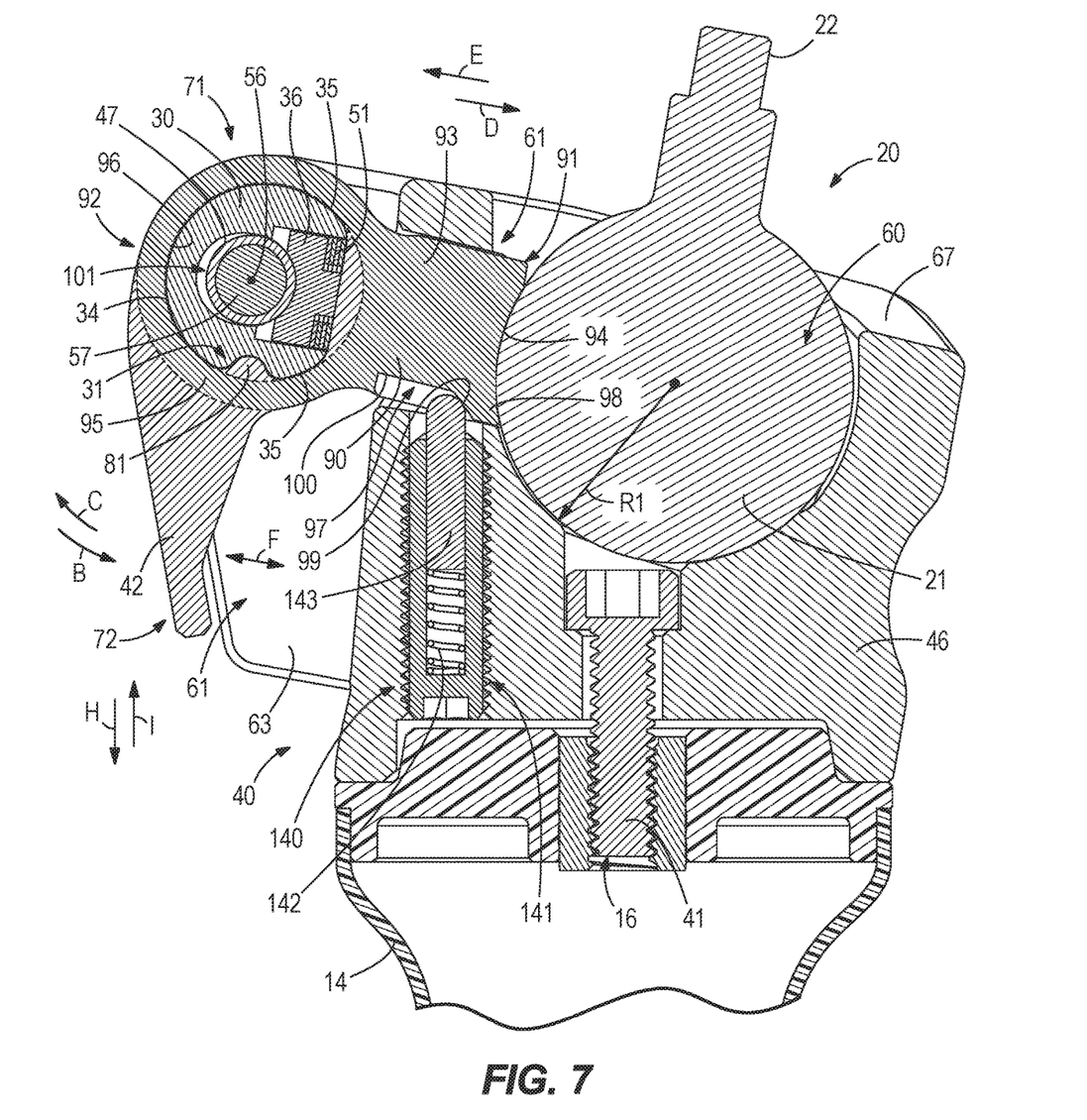
FIG. 7 is a cross-sectional view of the clamp of FIG. 1 with the lever in a locked position.

Referring to FIGS. 1-3, a clamp 40 is selectively coupled to the top of the handle 14, and the clamp 40 is for holding an adapter 20 that couples to a device, such as a camera 18 (depicted in dashed lines). The user couples the clamp 40 to the handle 14 by inserting a threaded stem 41 of the clamp 40 into a threaded bore 16 of the handle 14 (see dashed lines in FIG. 2 and see also FIGS. 6-7). To decouple to the clamp 40 from the handle 14, the user unscrews the stem 41 from the bore 16. The stem 41 of the example clamp 40 depicted in FIGS. 6-7 is a removable threaded bolt. Note that the clamp 40 can be coupled to any type of support device (e.g., a pole, a bracket, frame).

Figure 4:
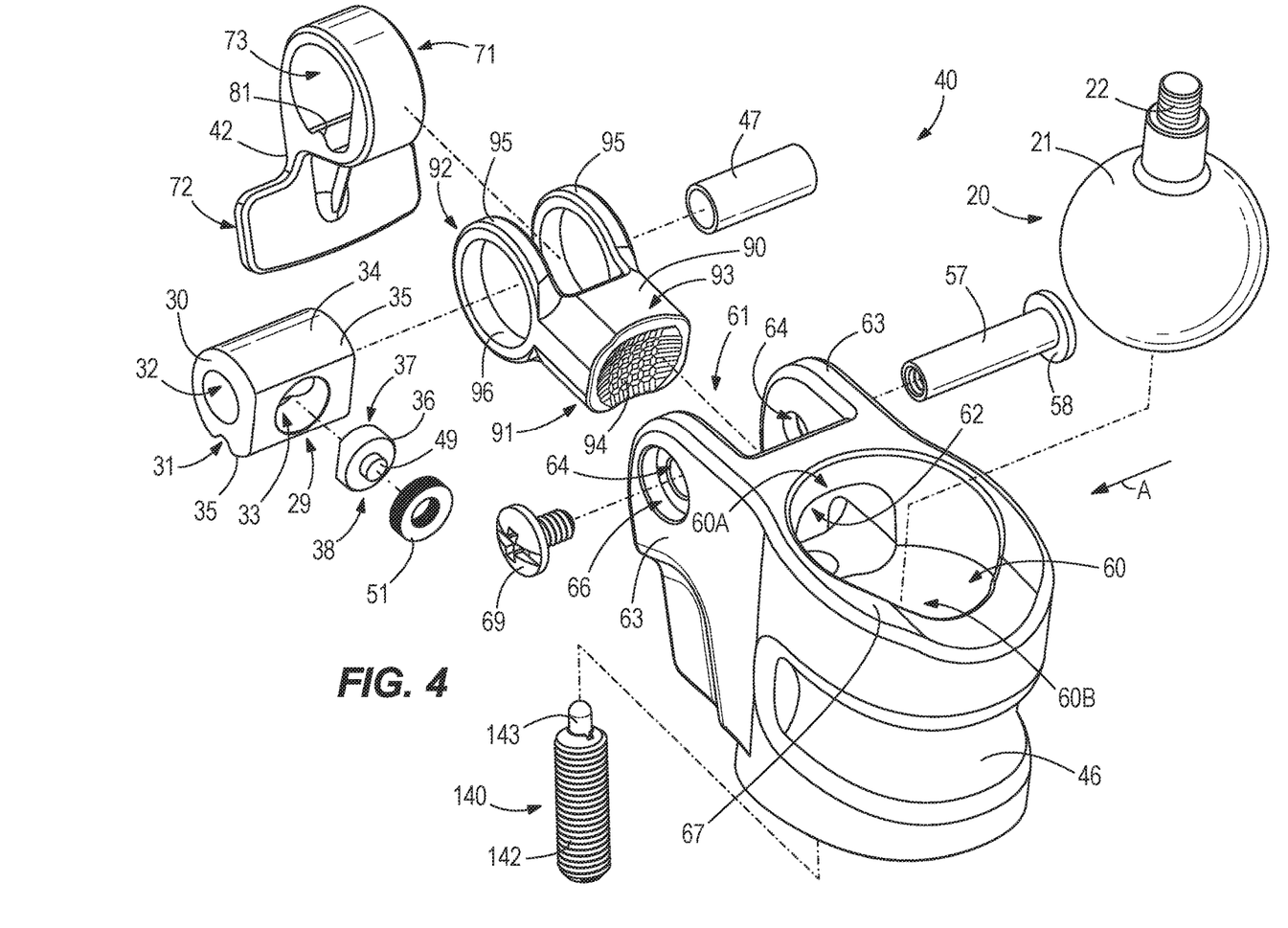
FIG. 4 is an exploded view of the clamp of FIG. 1.
Figure 5:
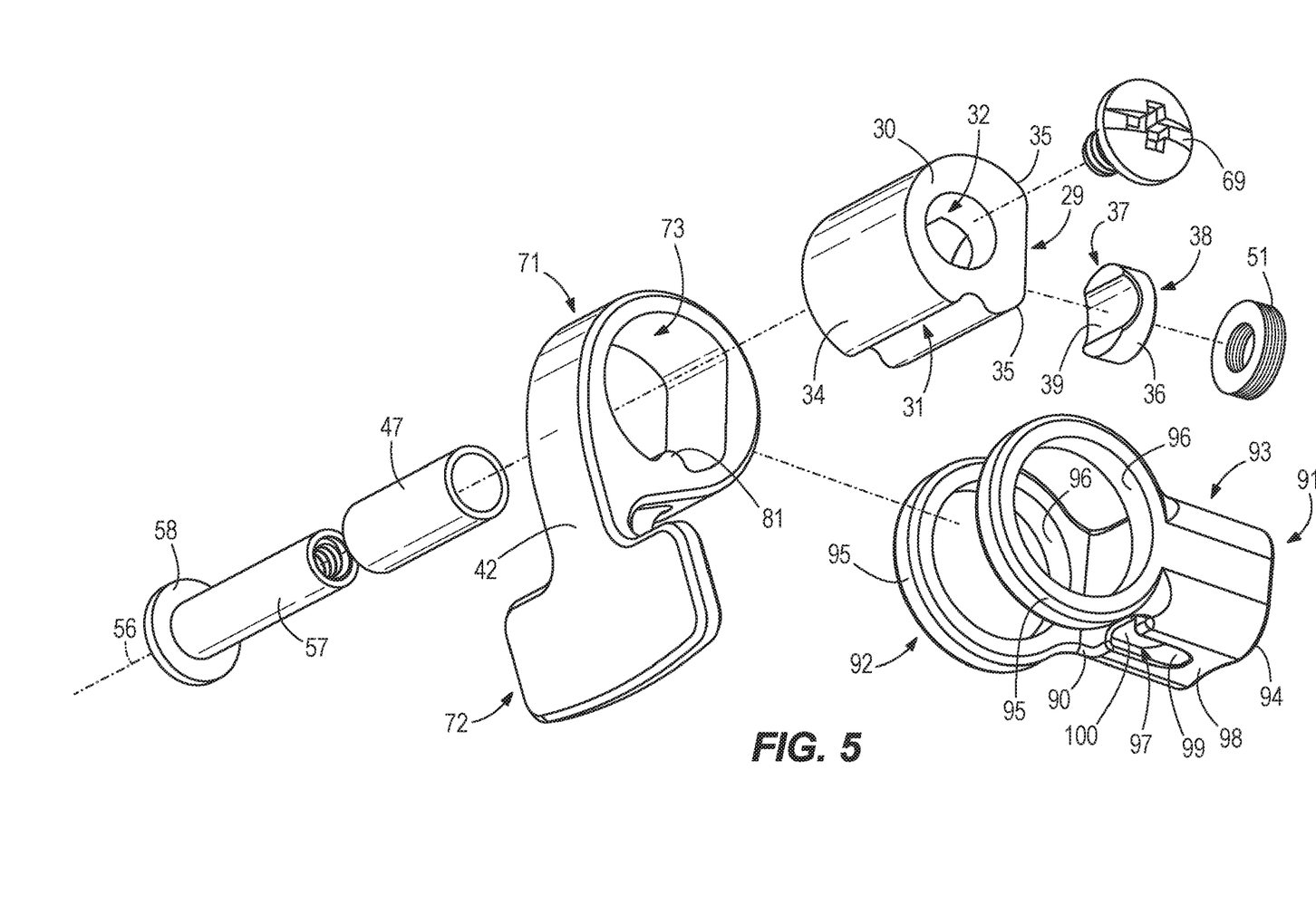
FIG. 5 is a partial exploded view of the clamp of FIG. 1.

Referring now to FIGS. 4-5, the clamp 40 has a body 46 with a sidewall 67 that at least partially defines a cavity 60 in which the user can selectively insert the adapter 20. Specifically, the user inserts a sphere 21 of the adapter 20 into the cavity 60. The adapter 20 has a threaded stem 22 that extends away from the sphere 21 (see FIG. 3), and the user couples the camera 18 (FIG. 1) to the stem 22. As such, the camera 18 is coupled to the clamp 40 via the adapter 20 (FIG. 1). The stem 21 has an industry-standard diameter and/or threads such that different types of devices (e.g., lights, cameras, speakers) can be easily coupled to the adapter 20 and the clamp 40.

The body 46 also has a pair of opposing arms 63 (FIG. 4) that extend in a direction away from the cavity 60 (see arrow E on FIG. 6). The arms 63 define a channel 61 in which other components (described herein) of the clamp 40 are received. The body 46 also has a passageway 62 (FIG. 4) that extends between the cavity 60 and the channel 61. The passageway 62 defines a path (e.g., an unobstructed path) between the cavity 60 and the channel 61. The cavity 60 has a first side 60A adjacent to the passageway 62 and an opposite second side 60B (FIG. 4).

A pivot member 57 extends through the channel 61 and along a pivot axis 56 (see FIG. 3) into holes 64 defined in each of the arms 63. The holes 64 align with each other such that when the pivot member 57 is in the holes 64, the arms 63 pivotably support the pivot member 57. The pivot member 57 has a first end with an enlarged head 58 that prevents the pivot member 57 from passing entirely through the holes 64 in a first direction (see arrow A on FIG. 4). The head 58 is recessed in a first recess 65 (FIG. 2) defined in the body 46. The opposite end of the pivot member 57 extends into a second recess 66 (FIG. 4) of the body 46. A removable fastener, such as a bolt, cotter pin, or screw 69, is coupled to the second end of the pivot member 57 to thereby secure the pivot member 57 to the arms 63. The head of the screw 69 is recessed in the second recess 66, and an optional removable cover (not shown) covers the head of the screw 69 and the second recess 66.

The pivot member 57 extends through several components, such as a lever 42, a pivot sleeve 47, a cam cylinder 30, and a plunger 90, that are at least partially positioned in the channel 61. These components are described in greater detail herein below, and FIGS. 6-7 depict these components assembled on the clamp 40. Note that while these components are described hereinbelow as separate components, any number of these components could be integrally formed with each other.

The pivot sleeve 47 encircles the pivot member 57, and the pivot sleeve 47 is positioned in a first bore 32 defined by the cam cylinder 30. The pivot sleeve 47 has an outer diameter sized to abut the cam cylinder 48, and the pivot sleeve 47 has an inner diameter sized large enough to encircle the pivot member 57 and allow the lever 42 to be pivoted about the pivot member 57 (described further herein).

As noted above, the pivot member 57 and the pivot sleeve 47 are in the first bore 32 of the cam cylinder 30 such that the cam cylinder 30 encircles these components. The cam cylinder 30 also has a second bore 33 that extends transverse to the first bore 32, and the second bore 33 receives a plug 36 and a first resilient member 51. The second bore 33 extends through a flattened end 29 of the cam cylinder 30. In one example, it is advantageous for the flattened end 29 to have a flat, planar surface that corresponds with flat surface of the lever 42 (see FIG. 5) such that the first resilient member 51 uniformly contacts the flat surface of the lever 42. The plug 36 has a first end 37 with a groove 39 in which a portion of the pivot sleeve 47 is received. A curved surface of the plug 36 that defines the groove 39 slides along the pivot sleeve 47. The plug 36 also has an opposite second end 38 with a tab 49 that engages the first resilient member 51. The plug 36 advantageously acts on and slides along the pivot sleeve 47 as the plug 36 is moved by the cam cylinder 30. As such, the cam cylinder 30 continuously acts on the pivot sleeve 47, or vice versa, even when the arch or path of the cam cylinder 30 varies due to the location of the plunger 90 and/or the size of the sphere 21. Accordingly, the cam cylinder 30 "floats" with the plunger 90. The first resilient member 51 includes a plurality of spring discs (e.g., a disc spring assembly), and the first resilient member 51 provides resiliency between the cam cylinder 48 and the plunger 90 (described further herein). In other examples, the first resilient member 51 can be a coil spring, leaf spring, or torsion bar.

The cam cylinder 30 further includes an exterior surface 34 with one or more cam surfaces 35 that cam the plunger 90 into contact with the sphere 21 of the adapter 20 (described hereinbelow). A keyway 31 is also recessed into the exterior surface 34, and the keyway 31 is configured to receive a key 81 of the lever 42 (described further herein). Note that in other examples the key 81 is on the cam cylinder 30 and the keyway 31 is in the lever 42.

The lever 42 has a pivot end 71 in the channel 61, and the pivot end 71 has a hole 73 in which the pivot member 57, the pivot sleeve 47, and the cam cylinder 30 are received. Thus, the pivot end 71 encircles these components. The pivot end 71 also has a key 81 projecting into the hole 73, and the key 81 is received into the keyway 31 of the cam cylinder 30 (see FIG. 6) to thereby rotationally fix the pivot end 71 to the cam cylinder 30. Thus, as the user pivots the handle end 72 (see arrows B and C of FIG. 6) about the pivot axis 56, the pivot end 71 of the lever 42 and the cam cylinder 48 rotate together. Note that the pivot end 71 covers the opening into the second bore 33 (FIG. 4) of the cam cylinder 30.

The lever 42 has a handle end 72 opposite the pivot end 71 that the user engages to thereby pivot the lever 42 about the pivot member 57. Specifically, the lever 42 is pivotable into and between a locked position (FIG. 7) in which the sphere 21 is secured in the cavity 60 and an unlocked position (FIG. 6) in which the sphere 21 can be removed from the clamp 40. Note that FIGS. 2-3 depict the lever 42 in the locked position. The present inventor has recognized that conventional clamps often do not permit the adapter 20 to be completely removed from the clamp when the clamp is not in use. Accordingly, these conventional clamps and the adapters 20 coupled thereto may become damaged during non-use and/or storage while the adapter 20 is in the clamp. Thus, the present inventor has endeavored to develop the example clamps 40 of the present disclosure that permit the adapter 20 to be completely removed therefrom so as to prevent damage to the clamp 40 and/or the adapter 20 during non-use and storage.

The plunger 90 has a first end 91, an opposite second end 92, and a center body 93 that extends between the ends 91, 92. A contact surface 94 at the first end 91 is for contacting the sphere 21, and the second end 92 has as pair of rings 95 that are positioned around the cam cylinder 30 such that one ring is on either side of the pivot end 71 of the lever 42. The rings 95 define an interior surface 96 that is contacted by one or more cam surfaces 35 of the cam cylinder 30 as the lever 42 is pivoted into and between the unlocked position (FIG. 6) and the locked position (FIG. 7). The plunger 90 extends through the passageway 62 and slides therein as the cam surfaces 35 cam the plunger 90 in the first plunger direction (see arrow D on FIG. 6) and the opposite second plunger direction (see arrow E on FIG. 6). The plunger 90 has a groove 97 defined in the exterior surface of the center body 93, a lip 98, and a sloped surface 99 that extends between the lip 98 and a groove surface 100 in the groove 97 (FIG. 5; described further hereinbelow).

FIGS. 6-7 depict movement of the lever 42, the cam cylinder 30, and the plunger 90 in greater detail. To secure the adapter 20 in the cavity 60, the user rotates the lever 42 about the pivot member 57 in a first pivot direction (see arrow B on FIGS. 6-7) such that the cam cylinder 30 cams the plunger 90 towards the cavity 60 and the contact surface 94 contacts the sphere 21 of the adapter 20 (see arrow D and FIG. 7). Specifically, as the user pivots the lever 42 from the unlocked position (FIG. 6) to the locked position (FIG. 7), the cam surface(s) 35 are rotated into engagement with the interior surface 96 at the second end 92 of the plunger 90, and as such, the cam surface(s) 35 cam the plunger 90 in a first plunger direction (see arrow D) toward the sphere 21. Thus, the sphere 21 is held or compressed between the plunger 90 and the sidewall 67 of the body 46 and secured in the cavity 60 such that the sphere 21 cannot move (e.g., rotate) in the cavity 60.

To rotate the sphere 21 in the cavity 60 and/or completely remove the adapter 20 from the clamp 40, the user rotates the lever 42 about the pivot member 57 in a second pivot direction (see arrow C on FIGS. 6-7) such that the cam cylinder 30 cams the plunger 90 away from the cavity 60 (see arrow E and FIG. 6). Specifically, as the user pivots the lever 42 from the locked position (FIG. 7) to the unlocked position (FIG. 6), the cam cylinder 30 cams the plunger 90 in the second plunger direction (see arrow E) such that the first end 91 of the plunger 90 is moved away from the sphere 21. Accordingly, the user can easily adjust the position of the sphere 21 in the cavity 60 and/or completely remove the adapter 20 from the cavity 60.

Note that as the user pivots the lever 42, the lever 42 rotates the cam cylinder 48. However, the lever 42 does not rotate the plunger 90. Instead, as noted above, the cam surface(s) 35 of the exterior surface 34 of the cam cylinder 30 move or cam the plunger 90 toward or away from the cavity 60. The exterior surface 34 of the cam cylinder 30 is radially eccentric with respect to the pivot axis 56. That is, the exterior surface 34 of the cam cylinder 48 is not concentric with the pivot axis 56 and the distance between the exterior surface 34 of the cam cylinder 30 and the pivot axis 56 varies. The exterior surface 34 is further oriented with respect to the lever 42 and the plunger 90 such that as the user pivots the lever 42, one or more of the cam surface(s) 35 engages with interior surface 96 of the rings 95 of the plunger 90 to thereby cam or move the plunger 90 towards or away from the cavity 60, as noted above (see arrows D and E on FIGS. 6-7).

The clamp 40 includes a first resilient member 51 disposed in the second bore 33 (FIG. 4) of the cam cylinder 30 between the pivot sleeve 47 and the pivot end 71 of the lever 42. Note that the first resilient member 51 rotates with the cam cylinder 30 (see FIGS. 6-7). As is briefly noted above, the first resilient member 51 provides resiliency between the cam cylinder 30 and the plunger 90, and the first resilient member 51 is configured to resiliently bias the plunger 90 radially (see arrows D and E on FIG. 5) against the sphere 21. As the cam cylinder 30 cams the plunger 90 toward the sphere 21 (see description above and arrow D on FIG. 6), the first resilient member 24 partially absorbs the radial force applied by the cam cylinder 30 against the plunger 90. Thus, the resiliency of the first resilient member 51 permits the clamp 40 to securely couple to different spheres 21 having different diameters or radii. The present inventor has recognized that the spheres 21 of conventional adapters 20 may be manufactured to have a radius within an acceptable tolerance range. Thus, it is advantageous for the clamp 40 of the present disclosure to accommodate different sizes of spheres 21 to thereby increase the usefulness of the clamp 40. As such, the first resilient member 51 is configured to permit slight movement of the cam cylinder 30 and/or the plunger 90 relative to the pivot axis 56 to thereby accommodate different sizes of spheres 21.

In FIG. 6, the first resilient member 51 is depicted in a decompressed position (e.g., the disc spring assembly is expanded). As the user pivots the lever 42 from the unlocked position (FIG. 6) to the locked position (FIG. 7), the first resilient member 51 is moved into a compressed position (FIG. 7) in which the first resilient member 51 is compressed between the pivot sleeve 47 and the pivot end 71 of the lever 42. In this example, the compression forces between the plunger 90, the cam cylinder 30, the pivot end 71 of the lever 42, and/or and the first resilient member 51 cause the pivot sleeve 47 to separate from the cam cylinder 30 such that a space or void 101 is defined between the pivot sleeve 47 and the cam cylinder 30. Although not depicted in FIGS. 6-7, a person of ordinary skill in the art will recognize that when a sphere 21 with a smaller radius (note that the sphere depicted in FIG. 7 has a first radius R1) is in the cavity 60, the plunger 90 will extend further into the cavity 60 to thereby contact the sphere 21 and the first resilient member 51 will be in a semi-compressed position (not shown) between the decompressed position (FIG. 6) and the fully compressed position (FIG. 7). In this example, the void 101 between the pivot sleeve 47 and the cam cylinder 30 will be less wide in the radial direction than the void 101 depicted in FIG. 7 due to the first resilient member 51 being in the semi-compressed position. Accordingly, the first resilient member 51 permits changes to the positions of the cam cylinder 30 and/or the plunger 90 relative to the pivot axis 56 when spheres 21 of different sizes are secured in the cavity 60 of the clamp 40. For example, FIG. 7 depicts the sphere 21 with a first radius R1 and the plunger 90 engaging the sphere 21. In this example, the plunger 90 is in a first plunger position. In another example, the sphere 21 depicted in FIG. 7 is replaced with the sphere 21 having a smaller, second radius (not shown) that is less than the first radius R1. When the lever 42 is pivoted into the locked position (FIG. 7), the plunger 90 is moved into the contact with the sphere 21 and the plunger 90 will be in a second plunger position that is different than the first plunger position depicted in FIG. 7 (e.g., in the second plunger position, the plunger 90 extends further into the cavity 60 in comparison to when the plunger 90 is in the first plunger position). In this instance, the first resilient member 51 would be in a semi-compressed position between the compressed position (FIG. 7) and the uncompressed position (FIG. 6).

Referring now to FIGS. 8-13, other example clamps 40 of the present disclosure are depicted. These clamps 40 include a second resilient member 110 that provides resiliency between the components of the clamp 40 such that the clamp 40 can accommodate different sizes of spheres 21. The second resilient member 110 is positioned in a cutout 112 in the sidewall 67 of the body 46. The cutout 112 is opposite the passageway 62 and is configured to receive the second resilient member 110. When the sphere 21 of the adapter 20 is received into the cavity 60, the second resilient member 110 biases the sphere 21 toward the plunger 90. Accordingly, when the lever 42 is moved into the locked position (FIG. 7) as described above, the second resilient member 110 helps to secure the sphere 21 in the cavity 60 as the plunger 90 is moved into contact with the sphere 21. The second resilient member 110 may flex or be moved by the sphere 21 as the plunger 90 applies forces to the sphere 21 in the first plunger direction (see arrow D). Note that while the example clamps 40 depicted in FIGS. 8-13 include the first resilient member 51, other example clamps 40 may exclude the first resilient member 51 and thereby only include the second resilient member 110.

Figure 8:
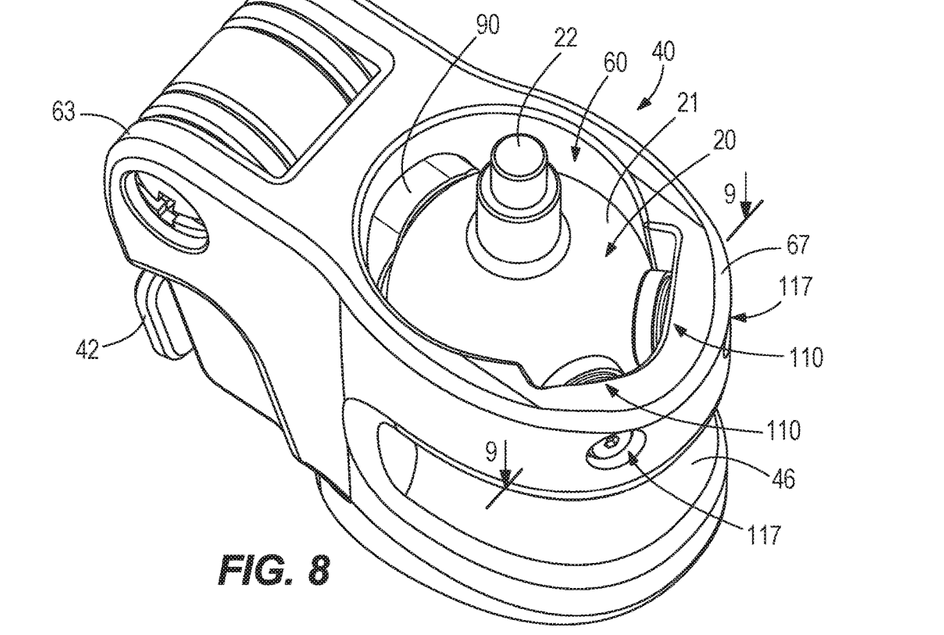
FIG. 8 is a perspective view of another example clamp of the present disclosure.
Figure 9:
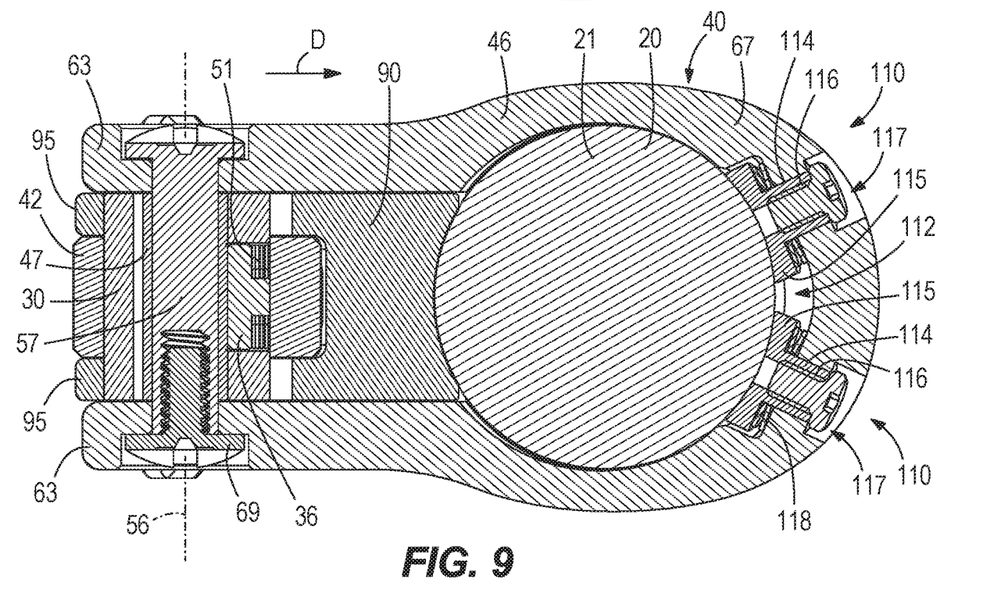
FIG. 9 is a cross-sectional view of the clamp of FIG. 8 along line 9-9.

The second resilient member 110 of FIGS. 8-9 comprises a pair of plugs 114 that each have a first end 115 for contacting the sphere 21 and a second end 116 that slides in a receiving hole 117 of the sidewall 67. Disc spring assemblies 118 between the first end 115 and the sidewall 67 bias the first end 115 of the plugs 114 away from the sidewall 67 in a direction toward the sphere 21. Accordingly, when the sphere 21 is received into the cavity 60 and/or when the lever 42 is in the locked position, the first ends 115 contact the sphere 21 and the disc spring assemblies 118 are at least partially compressed between the first ends 115 and the sidewall 67. The compression of the disc spring assembly 118 and the position on the second ends 116 in the holes 117 will depend on the size of the sphere 21.

Figure 10:
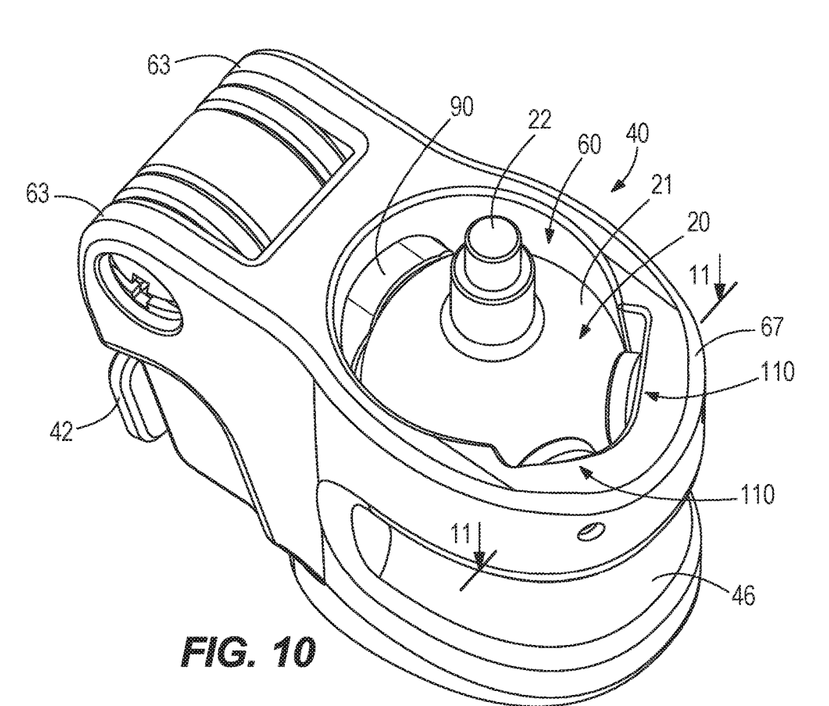
FIG. 10 is a perspective view of another example clamp of the present disclosure.
Figure 11:
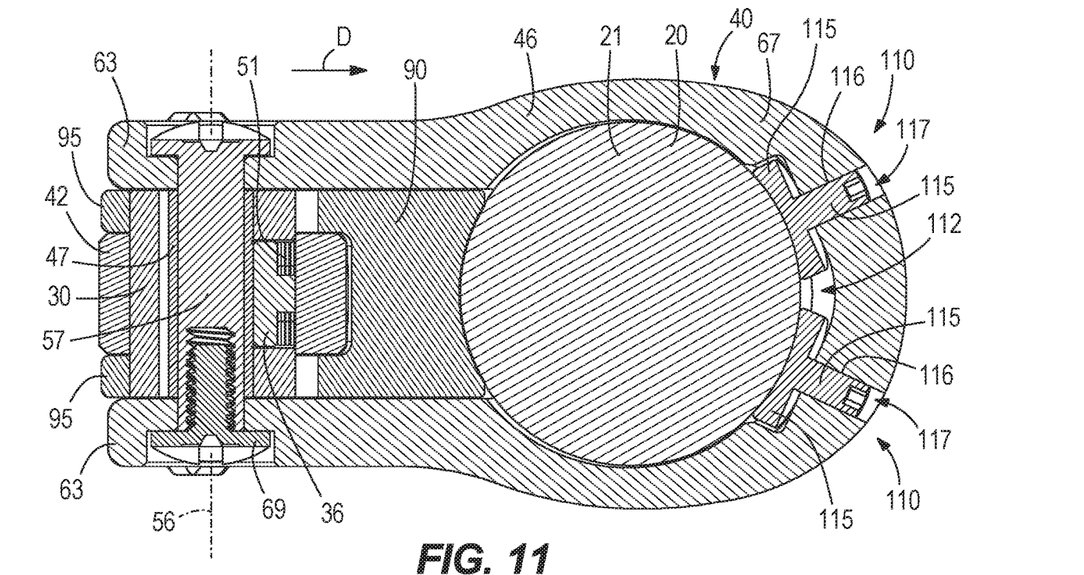
FIG. 11 is a cross-sectional view of the clamp of FIG. 10 along line 11-11.

The second resilient members 110 of FIGS. 10-11 are similar to the second resilient members 110 of FIG. 8-9, however, the first end 115 of the plugs 114 are friction pads and the disc spring assemblies 118 (FIG. 9) are excluded. When the sphere 21 is received into the cavity 60 and/or when the lever 42 is in the locked position, the first ends 115 frictionally engage the sphere 21. The friction pads may be made of compressible material such as rubber or foam.

Figure 12:
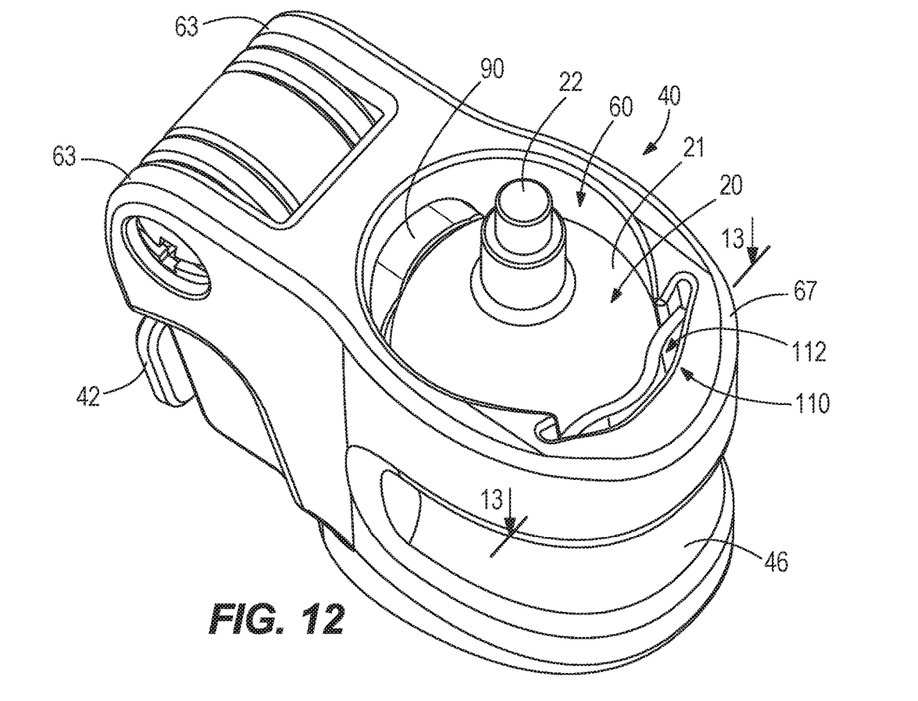
FIG. 12 is a perspective view of another example clamp of the present disclosure.
Figure 13:
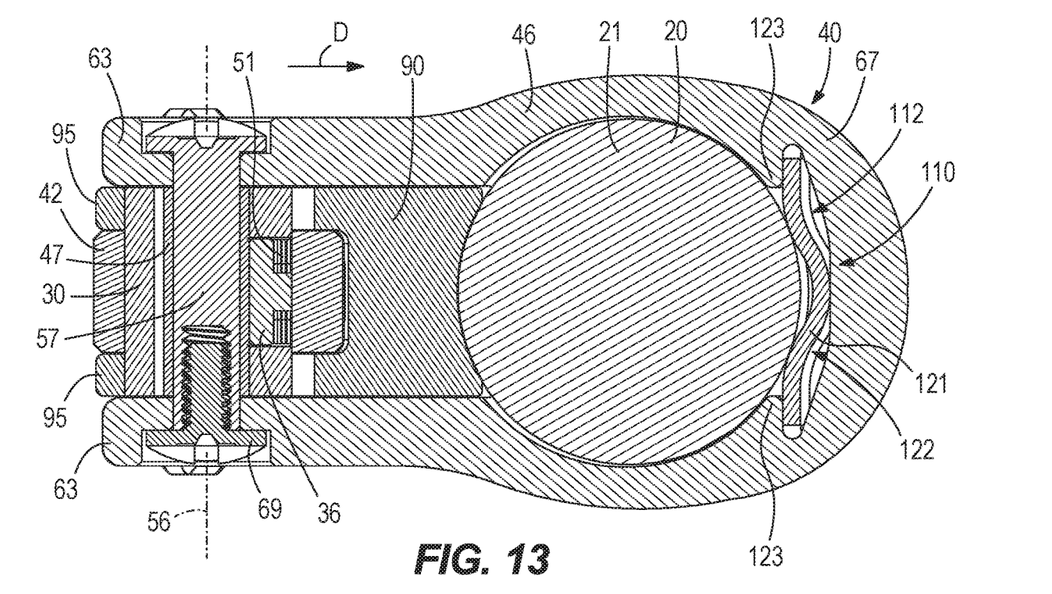
FIG. 13 is a cross-sectional view of the clamp of FIG. 12 along line 13-13.

The second resilient member 110 of FIGS. 12-13 comprises a leaf spring 121 retained in a cutout 122. Specifically, opposing ends of the leaf spring 121 are retained in the cutout 122 with lips 123. The leaf spring 121 depicted in FIG. 13 is in a flexed position such that the middle portion of the leaf spring 121 is flexed radially outwardly relative to the sphere 21 due to the sphere 21 being received in the cavity 60 and/or the lever 42 being moved into the locked position (FIG. 7). Accordingly, the resiliency of the leaf spring 121 helps to retain the sphere 21 in the cavity 60.

Referring back to FIGS. 6-7, the clamp 40 also includes a locking assembly 140 for locking the position of the plunger 90 when the lever 42 is in the locked position (FIG. 7). The locking assembly 140 is positioned in a bore 141 of the body 46, and the bore 141 extends transverse to and intersects the passageway 62. The locking assembly 140 has a spring 142 that biases a pin 143 toward the passageway 62 and the plunger 90. When the lever 42 is in the unlocked position (FIG. 6), the plunger 90 is moved (e.g., cammed) by the cam cylinder 30 into the position shown in FIG. 6. In this position, the lip 98 of the plunger 90 engages the pin 144 and forces the pin 144 in a first locking direction (see arrow H) against the spring 142 thereby compressing the spring 142. As the lever 42 is pivoted into the locked position (see arrow B and FIG. 7) and the plunger 90 is moved in the first plunger direction (arrow D) toward the cavity 60 (as described above), the lip 98, the sloped surface 99, and the groove surface 100 slide along the pin 143 and the pin 143 seats into a locked position (FIG. 7) in the groove 97.

With the pin 143 in the locked position (FIG. 7), the user must pivot the lever 42 with sufficient force to thereby unseat the pin 143 from the locked position (FIG. 7). That is, the user must pivot the lever 42 in the second pivot direction (see arrow C) with enough force to cause the sloped surface 99 to cam the pin 143 in the first locking direction (see arrow H) against the spring 142. In operation, as the user pivots the lever 42 in the second pivot direction (see arrow C), the sloped surface 99 slides along and gradually cams the pin 143 in the first locking direction (see arrow H). A person of ordinary skill in the art will appreciate that the inclusion of the sloped surface 99 and/or the lip 98 advantageously requires the user to apply a force to the lever 42 that is sufficient to counteract the spring forces exerted by the spring 142 on the pin 143 and thereby cause the sloped surface 99 to cam the pin 143 in the first locking direction (see arrow H). Accordingly, the sloped surface 99 and/or the lip 98 help prevent inadvertent movement of the plunger 90, the cam cylinder 30, and/or the lever 42 that would otherwise cause the sphere 21 to become uncoupled from or loose in the clamp 40.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification.

In the present description, certain terms have been used for brevity, clarity, and understanding. No unnecessary limitations are to be inferred therefrom beyond the requirement of the prior art because such terms are used for descriptive purposes and are intended to be broadly construed. The different apparatuses, systems, and method steps described herein may be used alone or in combination with other apparatuses, systems, and methods. It is to be expected that various equivalents, alternatives and modifications are possible within the scope of the appended claims.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A clamp for releasably clamping onto a sphere of an adapter, the clamp comprising:
   a body having a sidewall and a cavity, wherein the cavity is configured to receive the sphere;
   a pivot member coupled to the body and defining a pivot axis;
   a cam cylinder positioned around the pivot member, the cam cylinder having a cam surface;
   a plunger coupled to the cam cylinder;
   a lever coupled to the cam cylinder and being pivotable about the pivot axis, wherein as the lever is pivoted about the pivot axis, the lever rotates the cam cylinder;
   wherein as the lever is pivoted in a first pivot direction from a unlocked position to a locked position, the cam surface cams the plunger in a first plunger direction such that the plunger engages the sphere and the sphere is compressed between the plunger and the sidewall thereby securing the sphere in the cavity; and wherein as the lever is pivoted in a second pivot direction from the locked position to the unlocked position, the cam surface cams the plunger in a second plunger direction such that the sphere is freely removable from the cavity;

wherein the body has a passageway in which the plunger slides as the lever is pivoted and a bore that extends transverse to the passageway; and a locking assembly in the bore that locks the position of the plunger in the passageway when the sphere is secured in the cavity, the locking assembly includes a spring that biases a pin into engagement with the plunger;

wherein the plunger has a groove in which the pin is seated when the sphere is secured in the cavity and a sloped surface that cams the pin in a first locking direction against the spring bias when the plunger is cammed in the second plunger direction.

2. The clamp according to claim 1, wherein the body has a pair of arms that define a channel;
wherein the pivot axis extends through the channel; and
wherein the passageway defines is an unobstructed path between the cavity and the channel.

3. The clamp according to claim 1, wherein the body has a stem configured to couple to a tripod.

4. The clamp according to claim 1, further comprising a resilient member positioned in the cam cylinder;
wherein the resilient member acts on the lever; and
wherein the resilient member is configured to resiliently bias the plunger against the sphere.

5. The clamp according to claim 4, wherein the cam cylinder has a radially extending bore in which the resilient member is positioned.

6. The clamp according to claim 1, wherein the plunger has a lip, and wherein when the lever is in the unlocked position, the lip contacts the pin and prevents movement of the pin in a second locking direction away from the spring.

7. A clamp for releasably clamping onto a sphere of an adapter, the clamp comprising:
a body having a sidewall, a cavity, a passageway, and a bore extending transverse to the passageway, wherein the cavity is configured to receive the sphere;
a pivot member coupled to the body and defining a pivot axis;
a cam cylinder positioned around the pivot member, the cam cylinder having a cam surface;
a plunger coupled to the cam cylinder and extending in the passageway;
a lever coupled to the cam cylinder and being pivotable about the pivot axis, wherein as the lever is pivoted about the pivot axis in a first pivot direction from an unlocked position to a locked position, the lever rotates the cam cylinder such that the cam surface cams the plunger in a first plunger direction and the plunger engages the sphere; and
a locking assembly in the bore that locks the position of the plunger in the passageway when the lever is in the locked position;
wherein the locking assembly includes a spring that biases a pin into engagement with the plunger; and
wherein when the plunger has a groove in which the pin is seated when the lever is in the locked position.

8. The clamp according to claim 7, wherein the plunger has a sloped surface, and wherein as the lever is pivoted in a second pivot direction from the locked position to the unlocked position, the cam surface cams the plunger in a second plunger direction and the sloped surface cams the pin in a first locking direction away from the plunger and against the bias of the spring.

9. The clamp according to claim 7, wherein the plunger has a lip, and wherein when the lever is in the unlocked position, the lip contacts the pin and prevents movement of the pin in a second locking direction away from the spring.

10. A clamp for releasably clamping onto a sphere of an adapter, the clamp comprising:
a body having a sidewall, a cavity, and a passageway, wherein the cavity is configured to receive the sphere;
a pivot member coupled to the body and defining a pivot axis;
a cam cylinder positioned around the pivot member, the cam cylinder having a cam surface;
a plunger coupled to the cam cylinder and extending in the passageway;
a lever coupled to the cam cylinder and being pivotable about the pivot axis, wherein as the lever is pivoted about the pivot axis in a first pivot direction from an unlocked position to a locked position, the lever rotates the cam cylinder such that the cam surface cams the plunger in a first plunger direction and the plunger engages the sphere; and
a resilient member positioned in the cam cylinder, wherein the resilient member is configured to resiliently bias the plunger against the sphere;
wherein the cam cylinder has a radially extending bore in which the resilient member is positioned; and
a pivot sleeve around the pivot member and a plug with a curved surface in the bore of the cam cylinder, and wherein as the lever is pivoted, the curved surface of the plug slides along the pivot sleeve.

* * * * *

UNITED STATES PATENT AND TRADEMARK OFFICE
CERTIFICATE OF CORRECTION

PATENT NO. : 11,248,737 B2
APPLICATION NO. : 16/990282
DATED : February 15, 2022
INVENTOR(S) : Trent Ballentine It is certified that error appears in the above-identified patent and that said Letters Patent is hereby corrected as shown below:

In the Claims

Claim 2, Column 9, Line 25, after "defines" delete "is".

Signed and Sealed this
Twenty-fourth Day of May, 2022

Katherine Kelly Vidal
*Director of the United States Patent and Trademark Office*